(12) United States Patent
Kaltenbach et al.

(10) Patent No.: US 7,579,582 B2
(45) Date of Patent: Aug. 25, 2009

(54) SCANNING METHOD AND SCANNING APPARATUS

(75) Inventors: Thomas Kaltenbach, Gutach-Siegelau (DE); Klemens Wehrle, Winden (DE)

(73) Assignee: Sick AG, Waldkirch (DE)

( * ) Notice: Subject to any disclaimer, the term of this patent is extended or adjusted under 35 U.S.C. 154(b) by 105 days.

(21) Appl. No.: 11/789,466

(22) Filed: Apr. 24, 2007

(65) Prior Publication Data

US 2007/0252078 A1 Nov. 1, 2007

(30) Foreign Application Priority Data

Apr. 27, 2006 (EP) .................................. 06008795

(51) Int. Cl.
*G06K 7/10* (2006.01)
(52) U.S. Cl. ............. 250/234; 235/462.06; 235/462.11; 235/462.42
(58) Field of Classification Search ................. 250/234, 250/235, 236, 214 AG; 235/445, 462.06, 235/462.11, 492.17, 462.24, 462.41, 462.42
See application file for complete search history.

(56) References Cited

U.S. PATENT DOCUMENTS

| 2,935,619 | A | * | 5/1960 | Rogers ......................... 250/233 |
| 5,597,997 | A | * | 1/1997 | Obata et al. .................. 235/455 |
| 6,628,445 | B2 | * | 9/2003 | Chaleff et al. ................ 359/210 |
| 6,641,042 | B1 | * | 11/2003 | Pierenkemper et al. 235/462.01 |
| 6,847,859 | B2 | * | 1/2005 | Nuebling et al. ............. 700/217 |
| 6,849,860 | B2 | * | 2/2005 | Gehring et al. .............. 250/568 |
| 6,896,185 | B2 | * | 5/2005 | Uhl et al. ...................... 235/454 |
| 7,199,385 | B2 | * | 4/2007 | Wehrle et al. ........... 250/559.19 |
| 2001/0035489 | A1 | * | 11/2001 | Chaleff et al. ............. 250/201.1 |
| 2003/0233166 | A1 | * | 12/2003 | Nuebling et al. ............ 700/223 |
| 2003/0234289 | A1 | * | 12/2003 | Uhl et al. ...................... 235/454 |
| 2004/0051062 | A1 | * | 3/2004 | Gehring et al. .............. 250/568 |
| 2004/0144934 | A1 | * | 7/2004 | Wehrle et al. ........... 250/559.19 |
| 2007/0252078 | A1 | * | 11/2007 | Kaltenbach et al. ......... 250/236 |

FOREIGN PATENT DOCUMENTS

| DE | 1 099 244 | 2/1961 |
| DE | 102 266 63 | 12/2003 |
| EP | 1 079 322 A1 | 7/2000 |
| EP | 1 398 729 A1 | 8/2003 |

* cited by examiner

*Primary Examiner*—John R Lee
(74) *Attorney, Agent, or Firm*—Harness, Dickey & Pierce, P.L.C.

(57) ABSTRACT

A scanning method for optical scanning of a body includes illuminating the body by a lighting unit and a light receiver unit receives light transmitted from the lighting unit to the body and reflected by the body so that a scanning zone of a scanning unit is defined by the lighting unit and the light receiver unit. Two scanning units each having a scanning region are used, which overlap at least in part in an overlap zone, and at least when the surface of the body is in an overlap zone, the scanning sensitivity of at least one of the scanning units is reduced at least for the overlap zone. At least one scanning unit is used which is configured and/or arranged such that it can scan a part of the body which is as large as possible. A scanning apparatus is also provided for carrying out the scanning method.

25 Claims, 8 Drawing Sheets

SCANNING METHOD AND SCANNING APPARATUS

CROSS-REFERENCE TO RELATED APPLICATIONS

This application claims the benefit of European Patent Application No. 06 008 795.4, filed Apr. 27, 2006. The disclosure of the above application is incorporated herein by reference.

FIELD

The invention relates to scanning methods for the optical scanning of at least a part surface of a body, wherein the body is illuminated by at least one lighting unit and at least one light receiver unit can receive light transmitted onto the body by the lighting unit and reflected by the body so that a scanning zone of a scanning unit including the lighting unit and the light receiver unit is defined by the lighting unit and the light receiver unit, and to scan apparatus for the carrying out of such scanning methods.

BACKGROUND

The statements in this section merely provide background information related to the present disclosure and may not constitute prior art.

Cameras or scanning units having a lighting unit are used for the optical taking or scanning of bodies. The intensity of the lighting unit is matched to the requirements of the camera and/or of the application. A scanning unit includes a lighting unit and a light receiver unit such as is described, for example, in U.S. Pat. No. 6,628,445 B2.

6-side readings are used today, for example, for the reading of a barcode. The light beams of four side cameras or scanning units run at an angle (for example of 45°) to the conveying direction of a transport belt on which a body is guided through the reading zone. It is ensured by the oblique alignment of the four side cameras that each side of the body can be imaged irrespective of the position of the body. Cameras or scanning units are likewise provided for the upper and lower sides of the body.

It has to be avoided that the lighting units of the individual scanning units mutually influence one another. It should in particular be avoided that a multiple exposure of the zone to be scanned by a plurality of scanning units arises. In known solutions, this is precluded by the spatial separation of the light beams generated by the lighting units of the individual scanning units within the reading field, as is shown in FIGS. 11 and 12. FIG. 11 shows, in a schematic and perspective representation, the arrangement of a 6-side solution for the identification of a barcode on the surface of a body 10 which is guided through the reading device on the conveying device 12. Six scanning units 104, 108, 112, 116, 120, 124 each include a lighting unit which transmit light in the direction of a reading field and which can be formed e.g. by LED arrays, see U.S. Pat. No. 6,628,445 B2. The scanning units moreover each include a light receiver unit which can possibly receive light reflected by the body. It comprises, for example, an array of CMOS or CCD sensors. In this manner, the scanning units 104 to 124 define scanning zones 106, 110, 114, 118, 122 and 126 which are indicated in bar shape and which are aligned such that every surface of the body can be scanned. Two of the side surfaces to be scanned are designated by reference numerals 82 and 84 in FIG. 11. The upper surface to be scanned by the scanning unit 120 is designated by reference numeral 88. The scanning zone 126 of the lower scanning unit 124 extends in the example shown through an interruption 130 of the conveying device 12.

It is shown in FIG. 12 how in particular the four side scanning units 104, 108, 112, 116 are arranged such that the light beams of the individual lighting units do not overlap in the reading field 134. The reading field must have a corresponding length for this purpose. Due to the spatial separation of the light beams, a correspondingly large mechanical system design is required for the scanning which extends over a long region of the transport surface or technical conveying device. High demands must therefore be made on the consistency of the conditions in the large reading field. In particular when a plurality of conveyor belt segments are present, the speeds of the individual segments must be synchronized such that they run at the same speed, which makes very high demands on the system design. This is in particular hardly practical when the weight of the individual bodes has an influence on the transport belt speed of individual segments.

Independently of this, the prevention of over-exposure, for example by reflections or glare at the surface of the body to be scanned, or of a deterioration of the image quality resulting therefrom is desired.

In a generic scanning method for the optical scanning of at least one part surface of a body, the body is illuminated by at least one lighting unit. At least one light receiver unit can receive light which is transmitted onto the body by the lighting unit and is reflected by the body. The lighting unit and the light receiver unit defining a scanning zone of a scanning unit including the lighting unit and the light receiver unit. A generic scanning apparatus for the carrying out of such a method has at least one lighting unit for the illumination of at least a part of a reading field, at least one light receiver unit for the reception of light which may be reflected from the reading field and for the generation of a received signal and an evaluation unit for the evaluation of the received signal. A scanning zone of a scanning unit is defined by the light path from the lighting unit to the light receiver unit.

SUMMARY

It is the object of the present invention to provide scanning methods and scanning apparatus with whose aid the construction effort and/or the space requirements can be reduced.

In a first scanning method in accordance with the invention, at least two scanning units having one scanning zone each are used which overlap at least in part in an overlap zone. To prevent over-exposure arising in the overlap region, the scanning sensitivity of at least one of the scanning units is reduced at least for the overlap zone at least when the surface of the body is in an overlap zone.

The spatial separation of the light beams generated by the lighting units within the reading field is not necessary due to the use of scanning zones of the scanning units overlapping in the reading field. The individual scanning zones overlap in the reading field so that the scanning units can move more closely together. The system design can be smaller and the demands on the consistency of the conditions in the reading field can be lower.

Since the scanning sensitivity of least one of the respective scanning units is reduced at least when a surface of the body is in the overlap region of the scanning zones, the risk of a negative influence by overexposure by the simultaneous exposure by two or more lighting units is averted.

The scanning method in accordance with the invention therefore permits a more compact construction without there being any risk of over-exposure in individual zones.

A first scanning apparatus in accordance with the invention has at least two scanning units having at least two partly overlapping scanning zones for the carrying out of the scanning method in accordance with the invention of this aspect. A control unit is provided which reduces the scanning sensitivities of the scanning units with an at least partly overlapping scanning zone at least when the surface of the body is in the overlap zone.

In a preferred aspect of the method, the position and/or the alignment and/or the geometry of the body is determined with respect to at least one of the scanning units. It can be determined, for example, from the knowledge of the position and/or alignment and/or geometry when the surface of the body is located in the overlap zone of at least two scanning units.

The method and the apparatus are to be used particularly effectively when the body and the scanning units move relative to one another, in particular when the body is moved through the reading field on a conveying device. It can then additionally be determined from the position and/or alignment and/or geometry of the body on the conveying device, at a conveying speed which is known as a rule, for example, when one of the surfaces of the body enters into the reading field or into one or more scanning zones.

The position and/or the alignment and/or the geometry of the body can be determined during its path through the scanning zones. It is particularly advantageous for the position and/or the alignment and/or the geometry of the body to be determined before the body is located in the overlap zone.

Knowledge of the position and/or of the alignment and/or of the geometry of the body therefore permits an optimization of the scanning process in dependence on these parameters. A method such as is known from DE 102 26 663 A1 can be used to determine the position, for example.

A corresponding scanning apparatus has a determination device for the determination of the position and/or the alignment and/or the geometry of a body to be scanned with respect to the at least one lighting unit and/or the at least one light receiver unit. In a preferred embodiment, the determination device is arranged upstream of the reading field so that a determination of the position and/or the alignment and/or the geometry of the body on a transport belt can be determined before the body enters into the overlapping scanning zones.

In another preferred aspect of the scanning method in accordance with the invention, a check is made during the scanning process of whether a zone with over-exposure is present at a light receiver unit of a scanning unit. If this is the case, either the intensity of at least one part of a lighting unit of at least one scanning unit which illuminates the over-exposed zone or the reception sensitivity of at least one part of a light receiver unit of at least one scanning unit which receives light from this zone is reduced. A corresponding embodiment of the scanning apparatus in accordance with the invention has a device for this purpose for the determination of the intensity of illumination at least one part of at least one light receiver unit. In addition, a control unit is provided which controls the scanning apparatus using the information of the light receiver unit such that it correspondingly regulates the scanning sensitivity of the respective scanning units.

A scanning method and a scanning apparatus in accordance with these aspects effectively ensure that the image quality would not be negatively influenced by over-exposure. In particular when over-exposure occurs at a light receiver unit due to the multiple exposure of a surface zone of the body in overlapping scanning zones, the scanning sensitivity of the respective scanning units is regulated in this aspect such that the image quality is nevertheless sufficient.

Such an aspect also provides a corresponding regulating down of the scanning sensitivities with over-exposure due to other effects, for example reflections, as an additional favorable side effect.

Different methods can be used in the aspects of the invention, e.g. a shortening of the exposure time, to reduce the scanning sensitivity for an over-exposed zone or for an overlap zone.

It is e.g. possible that the scanning sensitivity of all scanning units which scan the overlap zone is reduced uniformly. In another aspect, the intensity of at least that part of a lighting unit is reduced which illuminates the overlap zone. Simply the reduction of the illuminating intensity of a lighting unit incident on the overlap zone can be sufficient to avoid over-exposure. It is only necessary for that part of the lighting unit to be reduced in intensity which illuminates the overlap zone. This can e.g. be achieved by reducing the intensity of a part of an LED array. It is optionally also possible to deactivate at least that part of a lighting unit which illuminates the overlap zone.

In another aspect, the reception sensitivity of at least that part of a light receiver unit is reduced onto which reflected light from the overlap zone of the scanning zones is incident. It is ensured by reducing the reception sensitivity that no over-strain which impairs the image quality of the light receiver units can occur in which reflected light is incident from the body which comes from the overlap zone which is illuminated by more than one lighting unit.

The reduction in the scanning sensitivities can take place, for example, in that the respective lighting units are reduced in intensity (or are switched off) and/or the light receiver sensitivities of the respective light receiver units are reduced.

It is particularly advantageous if only that part of the respective unit is correspondingly controlled which belongs to that part of the respective scanning zone through which the body to be scanned also runs.

For example, it is also possible to determine the moment at which the body comes through a zone possibly illuminated by a plurality of scanning units by knowledge of the relative speed between the body and the conveying device. The arrangement can also be controlled with this knowledge such that the described reduction of the scanning sensitivities only takes place when the surface of the body comes through this overlap zone.

A scanning apparatus corresponding to these aspects of the method e.g. has a control unit which controls the lighting units or the light receiver units correspondingly for the reduction of the scanning sensitivity for the overlap zone in dependence on the position and/or alignment and/or geometry of the body determined by the determination device or in dependence on over-exposure found.

In a particular embodiment with a relative movement of the body and of the scanning units, the control unit can additionally utilize a signal of the conveying device which corresponds to the speed of the conveying device so that it can be determined when the surface of the body comes through an overlap zone.

It is also possible that the sensitivities and their optionally necessary reduction in the overlap zone take account of the reflection properties or other surface qualities of the body.

Another scanning method further develops a generic scanning method in that at least one of the scanning units used is configured and/or arranged so ideally that a part of the surface of the body which is as large as possible can be scanned by a scanning unit.

A corresponding scanning apparatus has at least one scanning unit which is arranged or configured such that a part of the surface of the body which is as large as possible can be scanned with it.

A corresponding scanning method and a corresponding scanning apparatus reduce the required number of scanning units so that the constructional effort is reduced.

These scanning methods and scanning apparatus in accordance with the invention can also be combined particularly advantageously with the scanning methods and scanning apparatus in accordance with the invention described above in which individual scan zones or a plurality of scan zones overlap. Such an advantageous combination permits the further reduction of the construction effort and space requirement since, on the one hand, the number of the scanning units required is reduced and, on other hand, the scanning zones of individual present scanning units can overlap and thus reduce the space requirements.

A further development of the scanning method provides that a scanning unit is used with a movable scanning zone, preferably a pivotable scanning zone. It is possible in a simple manner with such a scanning method that an optimum scanning device and position of the scanning unit is set. Knowledge of the position and/or the alignment and/or the geometry of the body on a conveying device can be used for this purpose, for example.

In a particularly preferred further development, the scanning zone is moved such that it follows the body on a relative movement between the body and the scanning unit. The body moves past the scanning unit in such an aspect, for example, and provides the scanning unit with different zones of its surface for scanning in the meantime. In this manner, a large part of the surface can be scanned with one scanning unit or a few scanning units.

A corresponding embodiment of the scanning apparatus has at least one scanning unit for this purpose having a movable scanning zone, preferably a pivotable scanning zone. In addition, a control unit is provided which is configured to carry out a corresponding scanning process.

With apparatus with fixed scanning units, provision must be made that a surface region of maximum size is scanned in every case with any desired position, alignment or geometry of the body since these parameters are not known. In the described preferred aspect of the present invention, the scanning direction and/or the position of the scanning unit is/are only determined in dependence on the position, alignment or geometry so that the surface can also be covered with a lower number of scanning units.

For this purpose, a scanning unit having a movable scanning zone, preferably a pivotable scanning zone, is preferably used which is aligned in dependence on the previously determined position and/or alignment and/or geometry of the body so that it can detect a part of the surface of the body which is as large as possible.

Another aspect in which a scanning unit is used which is arranged and/or aligned such that it can scan the body from a plurality of sides, provides, on the other hand, that the body is first brought into a first scanning zone of a first scanning unit and, after exiting this scanning, is brought into a second scanning zone of a second scanning unit zone, said second scanning zone permitting a scanning of a surface zone of the body which was not completely detected by the first scanning zone. The second scanning unit is configured such that the lighting unit and the light receiver unit of the first scanning unit are co-used and additionally a redirector is used which is only illuminated by the lighting unit when the body is not located in the first scanning zone. With such an aspect, a first surface zone of the body is first illuminated directly by the lighting unit of the first scanning unit and the reflected light is detected by the associated light receiver unit. Once the body leaves the first scanning zone of this scanning unit, the light of the lighting unit is incident on the redirector and is directed by this redirector onto another surface of the body. The light reflected by this surface of the body returns to the redirector and from there to the light receiver unit. In this manner, a second scanning zone is fixed which comprises the lighting unit and the light receiver unit of the first scanning unit and the additional redirector. In such a scanning method, the number of the necessary lighting units and light receiver units is smaller than if each scanning unit has its own lighting unit or light receiver unit.

With a corresponding scanning apparatus in accordance with the invention, at least one first and one second scanning unit share a lighting unit and a light receiver unit, with the scanning zone of the second scanning unit additionally comprising a redirector, preferably a mirror. It is arranged such that it is only illuminated by the lighting unit when there is no body in the scanning zone of the scanning unit.

By a skillful arrangement of the redirector or by use of a plurality of redirectors, a larger number of scanning zones can also be fixed in this manner which share a lighting unit and/or a light receiver unit.

Scanning methods and scanning apparatus in accordance with the invention can use redirectors, in particular mirrors, which locally fix the scanning zone of a scanning unit so that the body to be scanned or the body led past passes through the scanning zone.

Beam splitters can also be used in all scanning methods and scanning apparatus in accordance with the invention in order to distribute the light of a lighting unit over a plurality of scanning units in order to reduce the number of required lighting units in this way.

Generally, the lighting unit and the light receiver unit of a scanning unit do not have to be at the same location. It must only be ensured that light transmitted by the lighting unit of a scanning unit onto the body and reflected by it reaches the associated light receiver unit. An aspect is particularly simple in which the lighting unit and light receiver unit belonging to a scanning unit are arranged adjacent to one another such that the light reflected by the body covers the same path in the opposite direction on its way to the light receiver unit which the light had covered from the lighting unit to the body.

A relative movement between the body to be scanned and the scanning unit can be achieved by movement of the scanning units past a stationary body, but preferably by the movement of the body through the scanning regions.

This can take place, for example, using a conveying device which guides the body through the scanning units. In addition, optionally, a device can be provided for the determination of the speed if this is not anyway known or fixed, for example.

The methods and apparatus in accordance with the invention are in particular suitable for the scanning of bodies, in particular parallelepiped bodies. Barcodes or other codes can be read, for example, in this connection. However, other elements on a body such as holograms can also be scanned. Finally, the methods and apparatus in accordance with the invention are also advantageously suitable for the taking of the total body or parts thereof in the sense of a camera. In this manner, clear space readings can also be carried out on the body.

The bodies to be scanned can have different shapes. In the present text, the term "body" is also used for areal structures. The invention is, however, particularly suitable for parallelepiped-shaped bodies.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
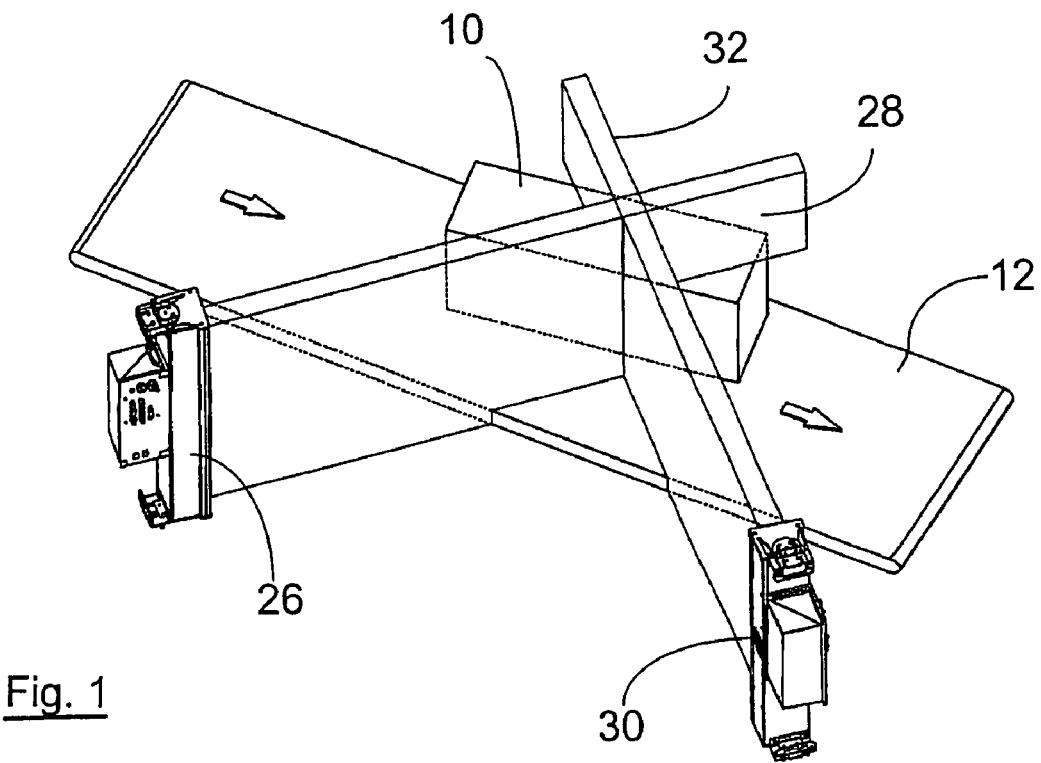
FIG. 1 illustrates a first aspect of a method in accordance with the invention in a perspective representation.

The following description is merely exemplary in nature and is not intended to limit the present disclosure, application, or uses. It should be understood that throughout the drawings, corresponding reference numerals indicate like or corresponding parts and features.

Figure 2:
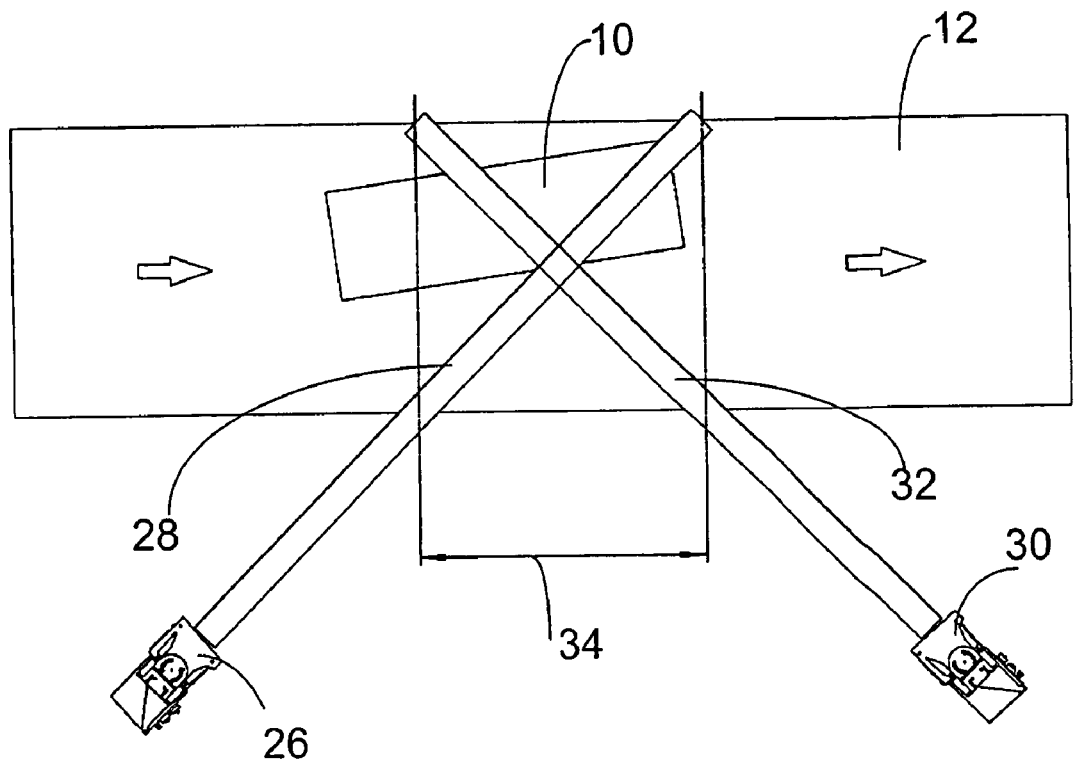
FIG. 2 is a plan view of an apparatus in the carrying out of this method in accordance with the invention.

A first aspect of a method in accordance with the invention is shown in FIGS. 1 and 2. A body 10 is moving on the conveyor belt 12 through the scanning regions 28, 32 of the scanning units 26, 30.

The zone is indicated in each case schematically in the form of a bar through which light of the associated scanning unit 14, 18, 26, 30, 36, 46, 50 passes in FIGS. 1 and 2 and all following Figures for the scanning zones 16, 20, 28, 32, 38, 48, 52, 72. In other words, the respective scanning zone corresponds to that zone in which a body to be scanned can be illuminated by light of the respective scanning unit.

Figure 11:
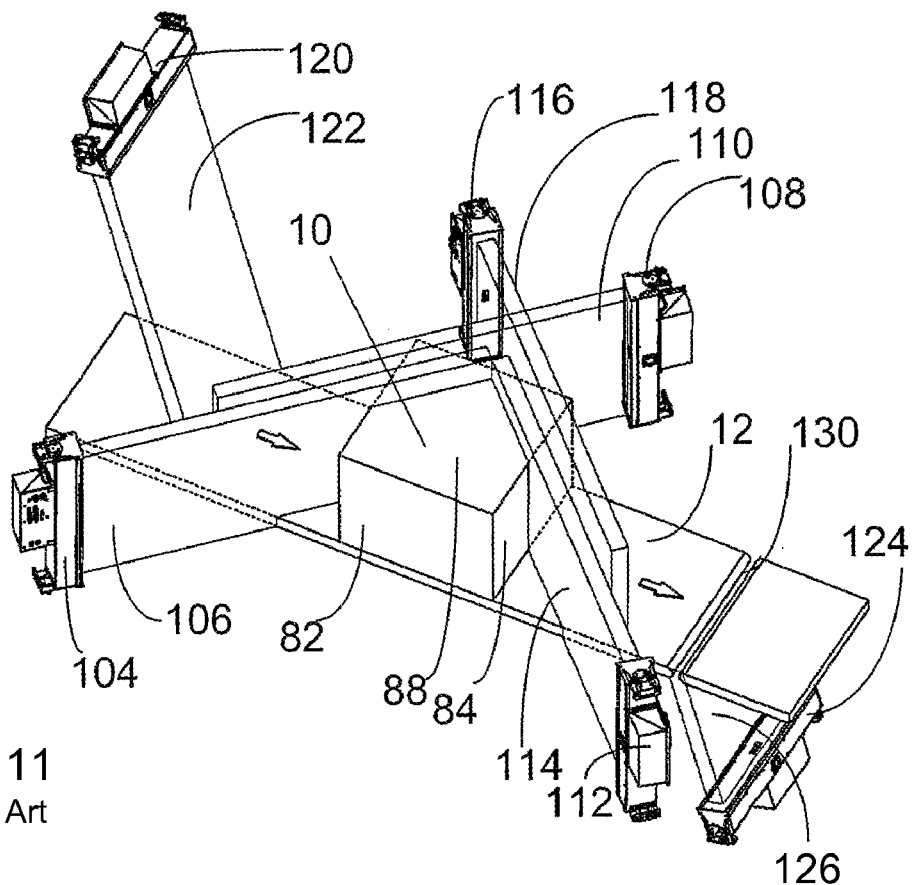
FIG. 11 illustrates a scanning method of the prior art in a perspective representation.
Figure 12:
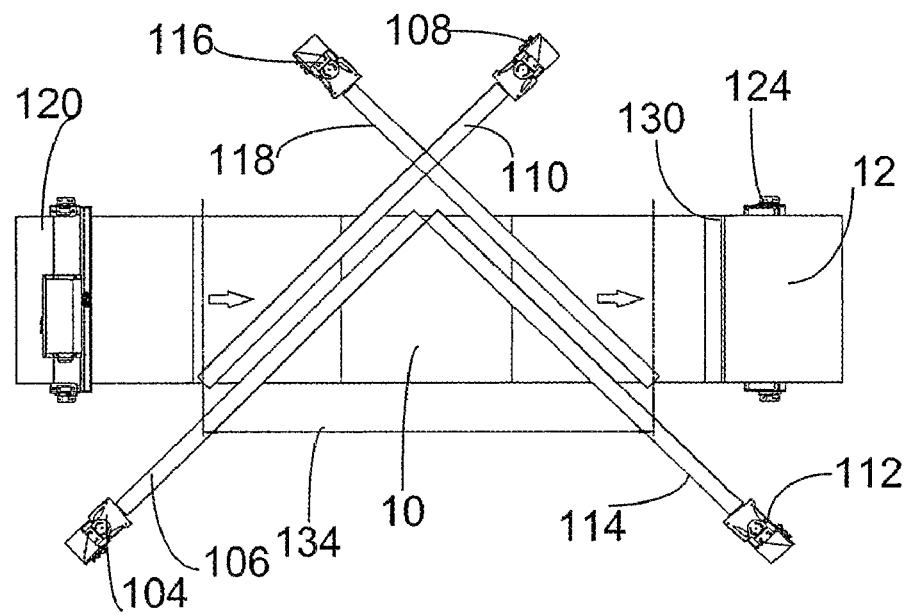
FIG. 12 illustrates the scanning method of the prior art in a plan view.

Further scanning units are provided per se in the embodiment of FIGS. 1 and 2 which can detect those sides of the body 10 which cannot be detected by the two scanning units 26, 30. In total, six scanning units are e.g. provided such is also the case in the prior art which is shown in FIGS. 11 and 12. The two scanning units 26 and 30 have been singled out by way of example in FIGS. 1 and 2 for the explanation of the invention for reasons of clarity.

A scanning unit 26, 30 includes in a manner known per se in each case an array of light emitting diodes which are arranged vertically in the example shown. Adjacent thereto or alternately to the light emitting diodes, light receiver sensors, e.g. an array of CCD sensors or CMOS sensors, are arranged in the scanning unit 26, 30.

Light which is e.g. transmitted by a scanning unit 26 in the direction of the body 10 passes through the scanning zone 28 and is possibly reflected by the body 10. The reflected light is detected by the sensors in the scanning unit 26. The scanning unit 30 with the scanning zone 32 works in a similar manner. For example, a barcode which is located on the body 10 on the surface facing the scanning units 26 and 30 can be read in this manner.

The embodiment of FIGS. 1 and 2 utilize the knowledge of the position, the alignment and/or the geometry of the body 10 on the conveyor belt 12 to avoid over-exposure. The scanning zones 28, 32 of the scanning units 26, overlap, as can be recognized in FIGS. 1 and 2. Unlike in the prior art, which is shown in FIGS. 11 and 12, the scanning units and the corresponding scanning zones 28, 32 are aligned such that the body 10 also runs through the overlap zone.

The scanning units 26, 30 are connected in a manner not shown to a control unit which individual zones of the scanning units can influence, e.g. reduce the intensity or switch off individual LEDs. In other aspects, the sensitivity of individual receiver sensors can be reduced.

Other scanning units which are e.g. arranged on the opposite side of the conveyor belt 12 or above and beneath the conveyor belt 12 have a similar structure or arrangement. These scanning units in particular also have overlapping scanning zones.

A determination device, which is not shown in the Figures, is provided upstream of the scanning units. It serves the determination of the position, the alignment and/or the geometry of the body 10 before it reaches the scanning zones 28, 32. The determination can, for example, use a method known per se such as is described in DE 102 26 663 A1.

The scanning units shown in FIGS. 1 and 2 can include mirrors which direct the light from lighting units into the scanning zones and back.

An aspect of FIGS. 1 and 2 works as follows:

Before the body 10 moves from the conveyor belt 12 to the scanning zones 28, 32, the position, alignment and/or geometry of the body on the conveyor belt 12 is determined by the determination device arranged upstream. The control device, likewise not shown, can determine the point at which the body 10 moves into the overlap zone of the scanning zones 28, 32 from the signal of the determination unit. At this moment, a double exposure is impending at this surface zone since light is incident onto a surface zone simultaneously from both scanning units 26, 30. Since it is known from the determination of the determination device when this is the case, the control device can influence the scanning units 26 and/or 30 at the corresponding moment. For instance, it can e.g. completely switch off the lighting unit of a scanning unit so that the overlap zone is only illuminated by one lighting unit of a scanning device at one moment in time.

Alternatively, the intensities of illumination of the scanning units 26, 30 can be reduced equally, e.g. halved, so that overexposure is precluded. The intensities of the individual scanning units can naturally also be reduced to different degrees in dependence on the application in order to avoid overexposure in the overlap zone.

Equally, the sensitivities of the light receiver units of the scanning units 26, 30 can be reduced accordingly so that the double exposure in the overlap zone remains without negative influence on the image quality.

Unlike in the prior art shown, for example, in FIGS. 11 and 12, the scanning units arranged obliquely to one another can move closer together by the overlap of the scanning zones 28, 32 which is not critical in the solution in accordance with the invention so that only a reading field 34 very much smaller than the reading field 134 required in the known solutions is necessary.

As is explained above for the example of the two scanning units 26, 30 with overlapping scanning zones 28, 32 singled out by way of example, further scanning units with overlap zones act, which are not shown in FIGS. 1 and 2, to also avoid overexposure.

Depending on the necessity, more than two scanning units with overlapping scanning zones can also be provided and treated accordingly.

Figure 3:
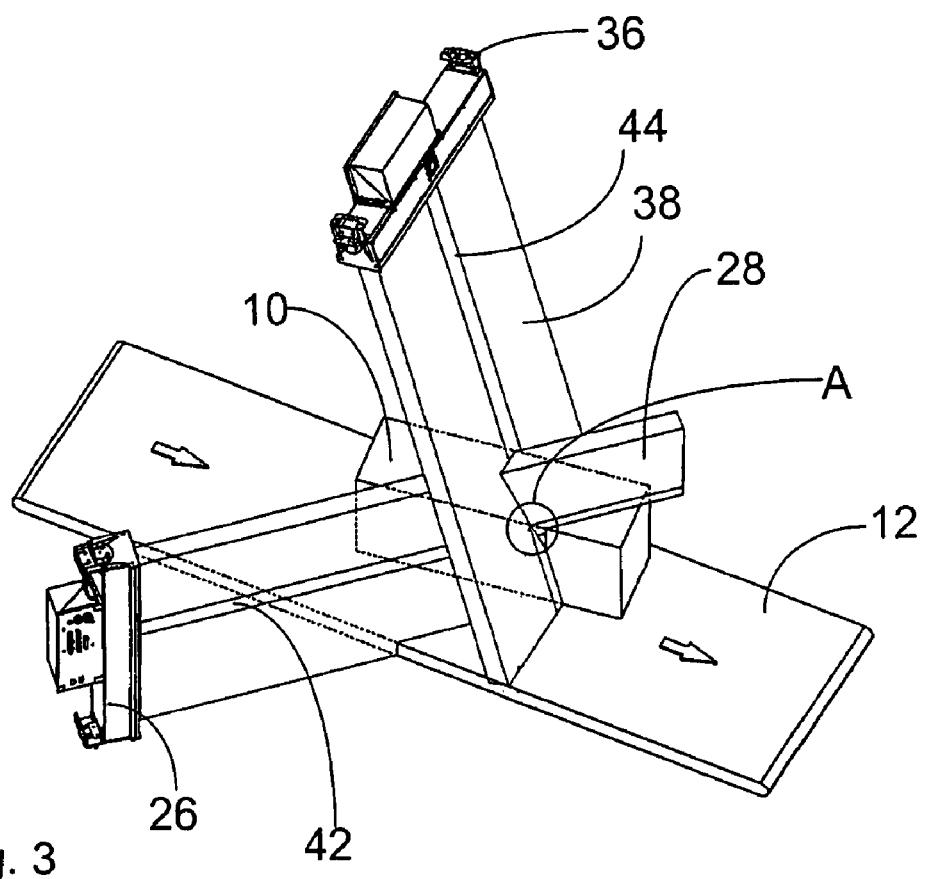
FIG. 3 illustrates a second aspect of a method in accordance with the invention in a perspective representation.
Figure 4:
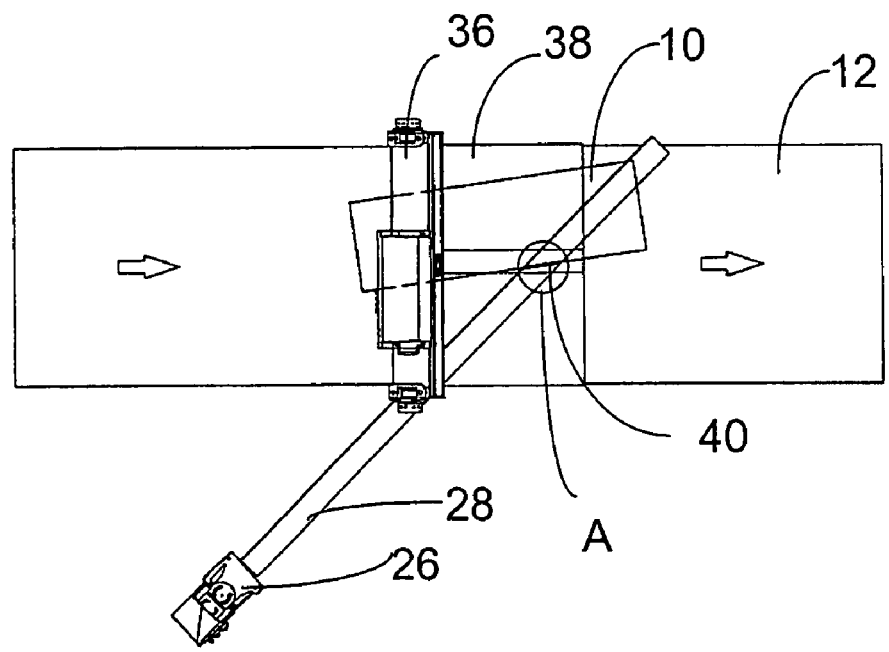
FIG. 4 is a plan view of an apparatus in the carrying out of the second aspect of the method in accordance with the invention.

A further development of the aspect of FIGS. 1 and 2 is shown in FIGS. 3 and 4.

Depending on the geometry of the body to be scanned and on the arrangement of the scanning units, it is possible that only sections or individual parts of the body within an image situation are over-exposed. It is then not necessary for the complete lighting unit or receiver unit of a scanning unit to be switched off or have its sensitivity reduced, but only the part of the lighting unit causing the over-exposure, e.g. a first third of a light emitting diode array, and/or that part of the light receiver unit affected by the over-exposure (e.g. the first third of a CCD sensor array).

A corresponding critical zone is designated by A in FIGS. 3 and 4. With the geometry shown, illumination takes place at this moment in particular in the zone with the reference numeral 40 both by the scanning unit 26 with its scanning zone 28 and by the scanning unit 36 with the scanning zone 38.

The position, the alignment and the geometry of the body 10 on the conveyor belt 12 were determined with the aid of the determination device, not shown, upstream of the scanning units. A control unit, not shown, which cooperates with the scanning units 26, 36, controls the scanning unit 26 in the example shown such that a zone 42 is blocked out of the scanning zone 28, e.g. in that the corresponding light emitting diodes of the light emitting diode array in the scanning unit 26 are switched off. The same applies to the spared region 44 in the scanning zone 38 of the scanning unit 36. The part 40 which is double exposed on an uninfluenced use of the scanning units 26, 36 is accordingly not illuminated at all so that no over-exposure or glare can occur here. Alternatively, the intensity of the light emitting diodes of the light emitting diode arrays of the scanning units 26, 36 responsible for the spared regions 42, 44 can be reduced.

Finally, it is also possible in this aspect for the sensitivity of the CCD sensors in the scanning units 26, 36 responsible for the registration of light from the critical zone 40 to be correspondingly reduced so that a double exposure of the part 40 remains without negative influence.

Figure 5:
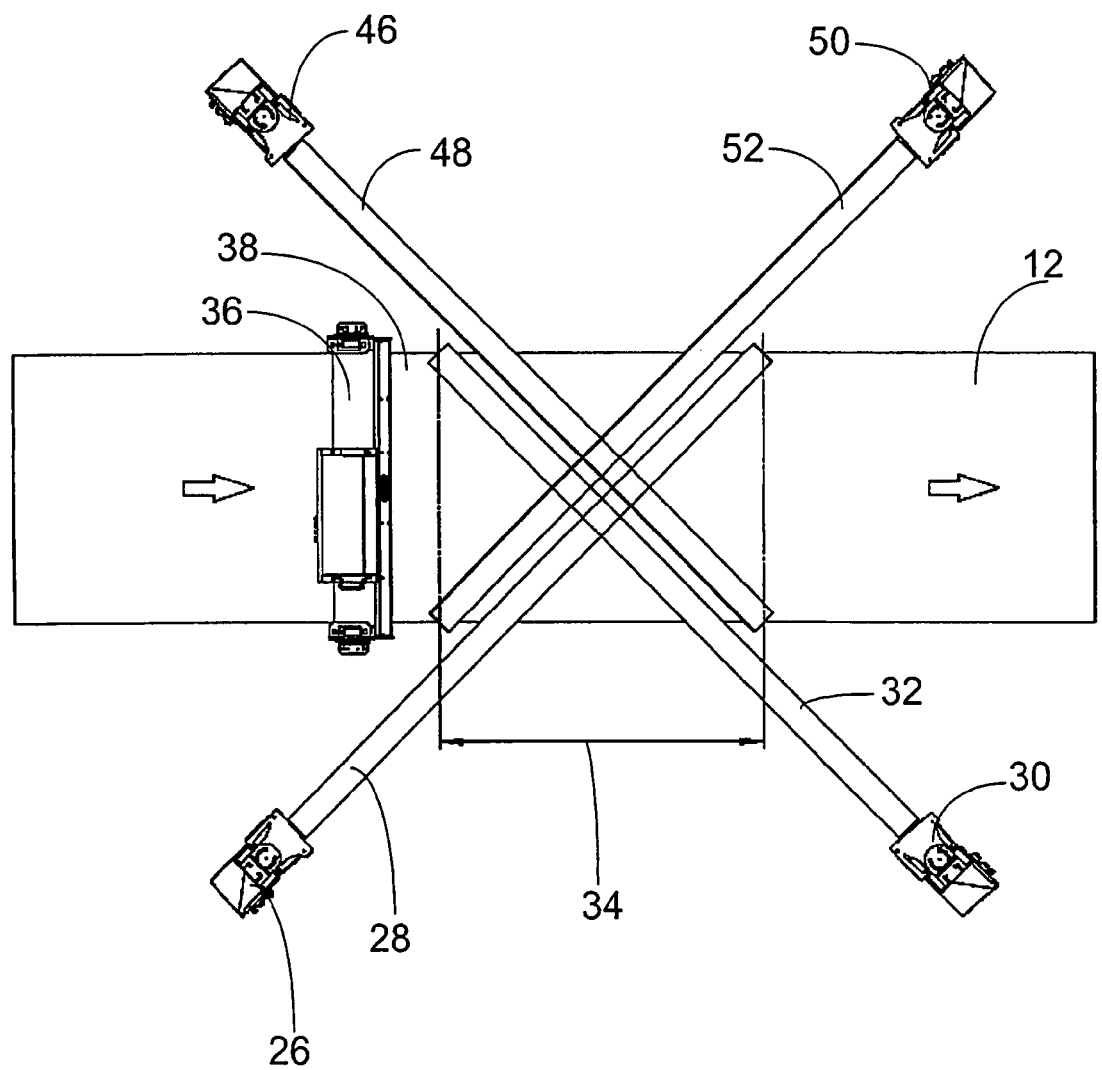
FIG. 5 is a plan view to explain a method in accordance with the invention.

FIG. 5 shows a plan view in which at least the scanning units 26, 30, 46, 50 responsible for the side surfaces of a body to be scanned and the associated scanning zones 28, 32, 48, 52 are shown. It is fixed, as described, by the position, alignment and/or geometry of a body to be scanned determined using the determination unit arranged upstream and not shown in FIG. 5 when a control reduces the scanning sensitivity of individual parts of the scanning units 26, 30, 46, 50, e.g. in that individual parts of the LED arrays of the lighting units are switched off or the sensitivity of individual parts of the CCD arrays of the receiver units is reduced. It can clearly be recognized that the reading zone 34, which is necessary to detect all the side surfaces of a body to be scanned, is a great deal shorter than the reading zone 134 which is necessary in standard configurations, see FIG. 12.

The scanning unit 36 is additionally shown in FIG. 5 which can serve for the scanning of the upwardly facing surface of the body 10. For reasons of clarity, however, the scanning zone of the scanning unit 36 is not shown. A scanning unit which serves for the scanning of the lower side of the body and whose scanning zone optionally leads through an interruption of the conveyor belt (as e.g. the interruption 130 in the conveyor belt 12 which is shown in FIG. 1) is likewise not shown in FIG. 5. Optionally overlapping scanning zones of such scanning units are treated in the same way as the overlapping zones of the scanning zones 28, 32, 48, 52 shown in FIG. 5.

In addition, a sensor can be provided in the aspects described, for example, with respect to FIGS. 1 to 5 which detects the conveying speed of the conveyor belt 12 if this is, for example, not anyway known. The control can additionally determine when one of the surfaces of the body enters into the overlap zone of two scanning units from the time at which the body passes the determination unit, for example. With this knowledge, the control unit can control the scanning sensitivity such that a corresponding regulating down of the scanning sensitivities is only carried out when one of the surfaces of the body is also in the overlap zone.

Figure 6:
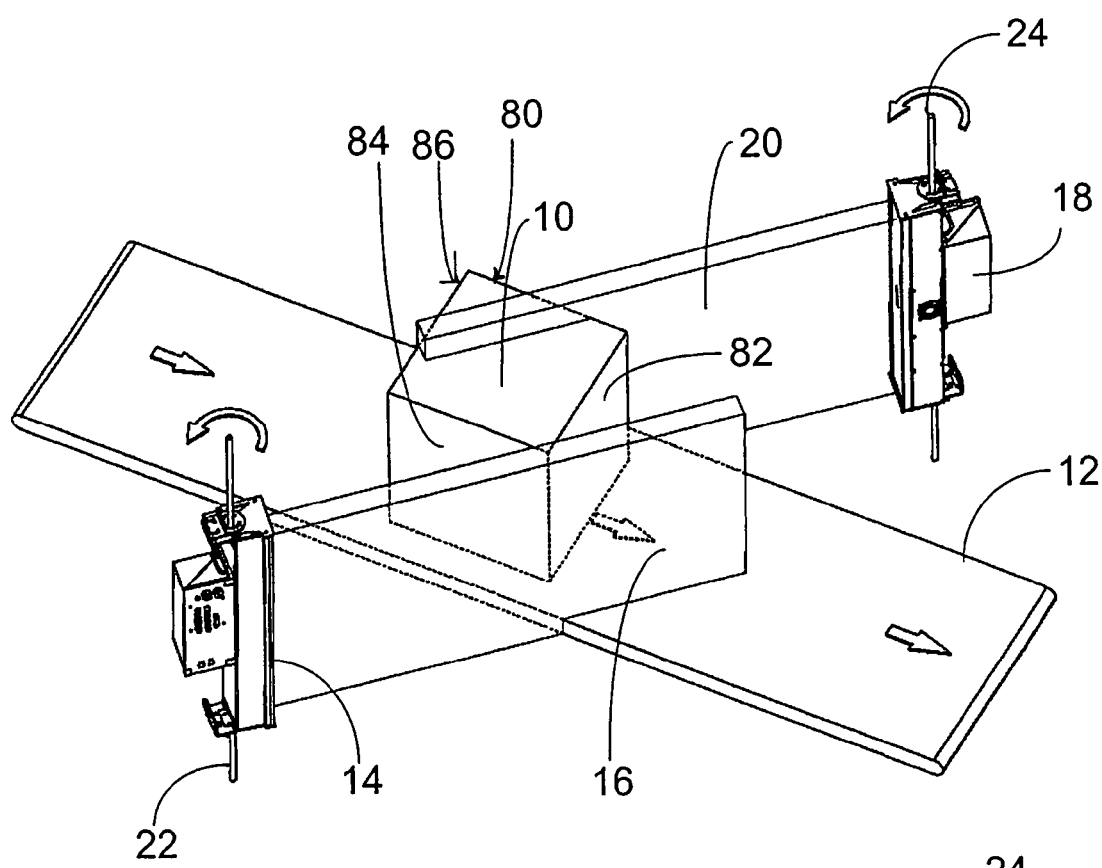
FIG. 6 illustrates a third aspect of a method in accordance with the invention in a perspective representation.
Figure 7:
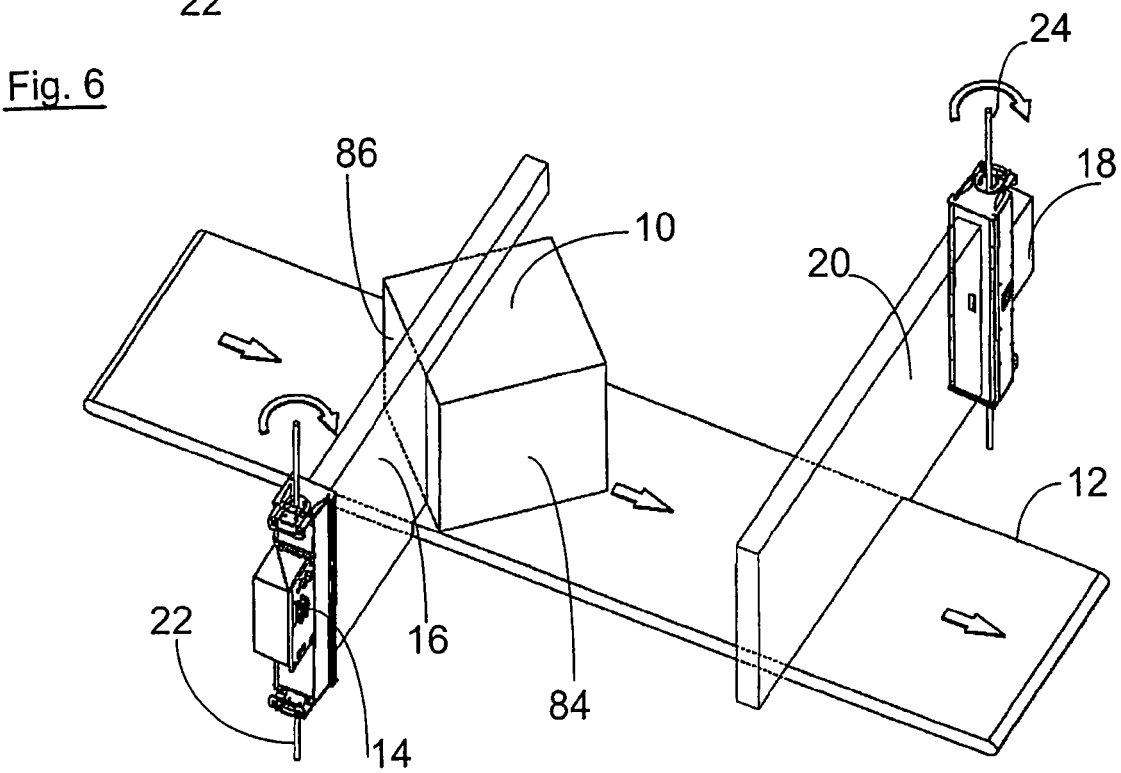
FIG. 7 illustrates the third aspect in a different geometry of use.

FIGS. 6 and 7 show a third aspect of a method in accordance with the invention in which scanning units 14, 18 are used which can be pivoted. The scanning unit 14 can be pivoted around the axis 22, whereas the scanning unit 18 can be pivoted around the axis 24. The scanning units 14, 18 themselves have the same structure as the scanning units 26, 30 of FIGS. 1 and 2.

FIG. 6 shows an arrangement which is advantageously selected when the main surfaces of the body 10 are aligned parallel or perpendicular to the conveying direction of the transport belt 12.

FIG. 7 shows the arrangement such as is advantageously selected when the surfaces of the body 10 are aligned obliquely to the conveying direction of the conveyor belt 12.

The scanning units 14 and 18 are connected to a control, not shown, which provides the alignment of the scanning zones 16, 20 in that the scanning units 14, 18 are pivoted around their axes 22, 24.

It is also possible that one or more mirrors are provided which direct the light from light sources into the corresponding scanning zones. With such an embodiment having corresponding mirrors, it is sufficient for the mirrors to be arranged pivotably in order to direct the light into the scanning zones or out of the scanning zones to light receiver units.

A determination device is provided upstream of the scanning units which is not shown separately and which detects the position or alignment of the body in a manner known per se.

This aspect of FIGS. 6 and 7 is used as follows. The body 10 moves on the conveyor belt 12 in the direction of the scanning units 14, 18. The position and alignment of the body is determined by the determination device not shown in the Figures. The control unit determines an optimum alignment of the scanning units 14, 18 from the signal of the determination device such that a respective part of the surface of the body 10 which is as large as possible is covered by a scanning zone 16, 20. The control unit in the method management of FIG. 6 has thus set the scanning unit 18 such that the scanning zone 20 covers both the surface 82 and the surface 80. The scanning zone 16 of the scanning unit 14 covers the surface 84 and the non-visible surface 86. All four side surfaces of the body 10 can be covered using only two scanning units.

In the method management of FIG. 7, the determination device upstream of the conveyor belt 12 has found that the body 10 is differently aligned. The control unit has determined that an optimum position of the scanning units 14, 18 is not oblique to the conveying direction as in FIG. 6, but transverse to the conveying direction. As can be recognized in FIG. 7, it is possible in this manner that the scanning unit 14 covers the surfaces 84, 86 of the body 10, whereas the scanning unit 18 covers the two side surfaces not visible in FIG. 7.

All the side surfaces of the body 10 can accordingly be covered with only two scanning units since the control device determines an optimum position of the scanning units 14, 18 from the signal of the determination device which is not shown. With respect to a solution of the prior art, not four scanning units (see FIGS. 11 and 12), but only two scanning units 14, 18 are required to cover the side surfaces.

The embodiments which take account of the influence of the overlap of scanning zones (as e.g. in the embodiments of FIGS. 1 to 5) can naturally e.g. advantageously be combined with the embodiments of FIG. 6 or 7 which describe a reduction in the number of the scanning units by an optimum arrangement of the scanning directions or the position of the scanning units.

Figure 8A:
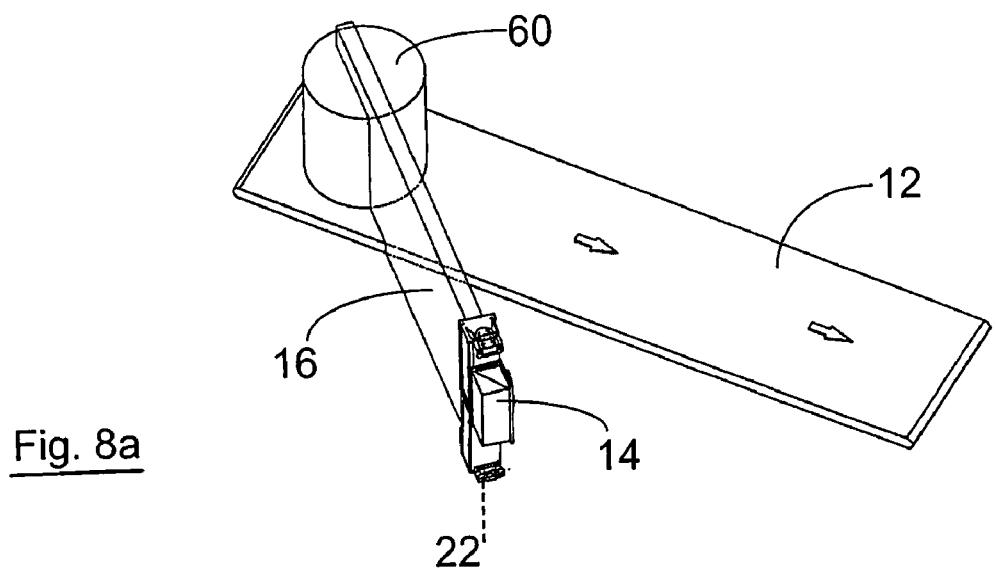
FIG. 8 illustrates different stages of a fourth aspect of a method in accordance with the invention in a perspective representation.
Figure 8B:
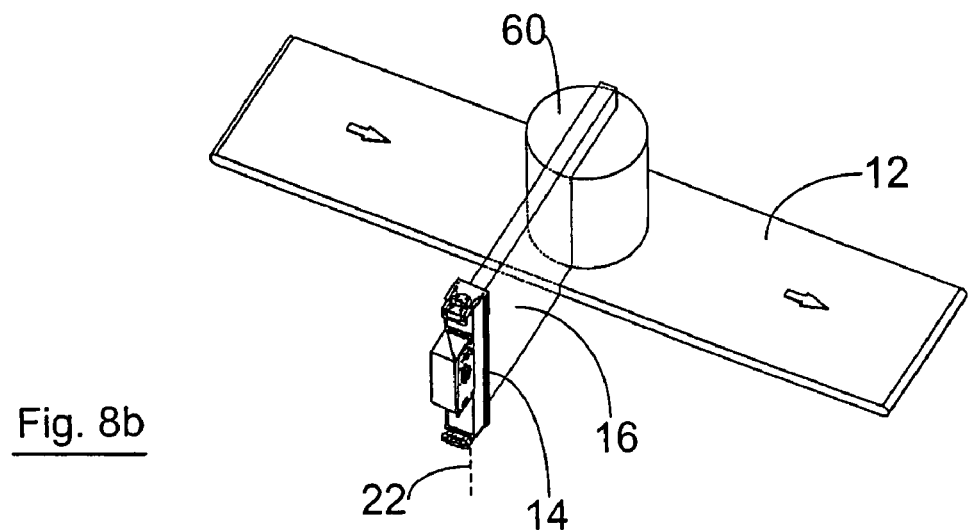
Figure 8C:
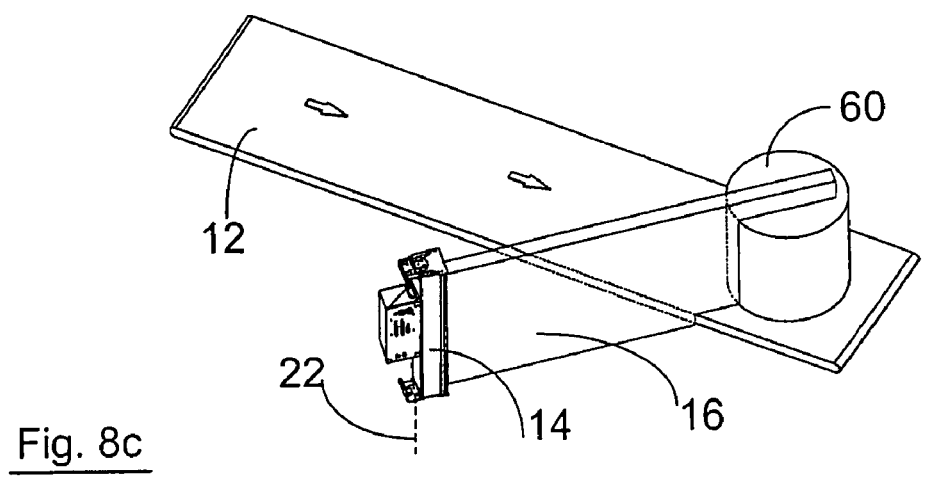

FIG. 8 shows an aspect of a method in accordance with the invention with a scanning unit 14 pivotable around the axis 22. A body 60 is moved along by the conveyor belt 12. A barcode to be read is located e.g. on its surface. The structure of the scanning unit 14 corresponds to the scanning unit 26 such as was explained e.g. with respect to FIGS. 1 and 2.

As soon as the body 60 enters into the scanning zone 60 of the scanning unit 14, the light receiver unit of the scanning unit 14 registers reflected light. A control unit matches the movement of the scanning unit 14 around the pivot axis 22 to the movement of the body 60 on the conveyor belt 12. The scanning unit is positioned in dependence on the object position during the scanning procedure. This can e.g. be effected with knowledge of the position and/or alignment and/or geometry of the body on the conveyor belt 12 and of the speed of the conveyor belt 12 by a control unit not shown in FIG. 8. Alternatively, the control unit can evaluate the light received at the light receiver unit of the scanning unit 14 to determine whether the body has moved out of the scanning zone 16 in order thus to control the tracking movement of the scanning unit 14.

In every case, the scanning zone 16 follows the movement of the body 60 on the conveyor belt 12. As can be recognized in the part Figures a to c of FIG. 8, the body 60 provides different zones of its surface for scanning to the scanning zone 16 over the course of time. Only one scanning unit 14 is required in this aspect to detect a complete half of the body 60 to be scanned. A scanning unit can be provided on the other side of the conveyor belt 12 for the scanning of a rear side of the body 60 which is not visible.

In FIG. 8, the cylindrical shape of the body 60 has only been selected to be able to show the scanning of the side better. In reality, mostly parallelepiped bodies are scanned, with the function of the embodiment of FIG. 8 not changing thereby.

If it is not clear in advance whether the barcode to be read is located at the side surface or on one of the top surfaces, additional scanning units are also provided here.

Alternatively to the embodiment shown in FIG. 8, the light of a lighting unit can also be directed into the scanning zone 16 or out of the scanning zone 16 to a light receiver unit with the aid of a redirector, for example a mirror. It is then sufficient for the redirector to be configured pivotable itself.

Figure 9A:
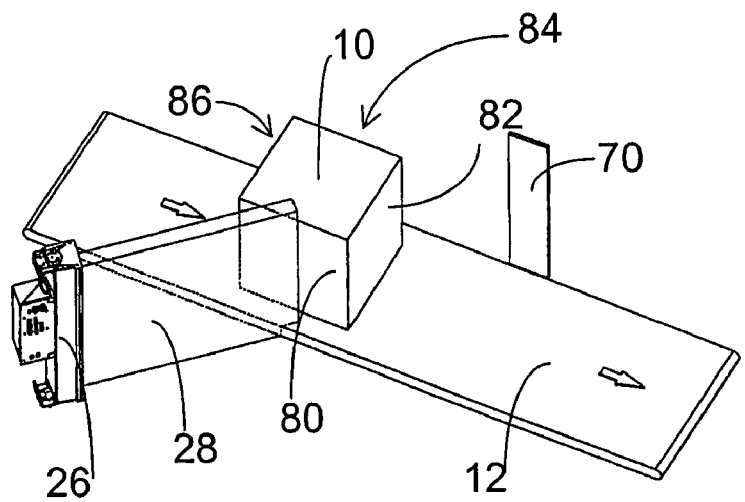
FIG. 9 illustrates different states in the carrying out of a fifth embodiment of a method in accordance with the invention in a perspective representation.
Figure 9B:
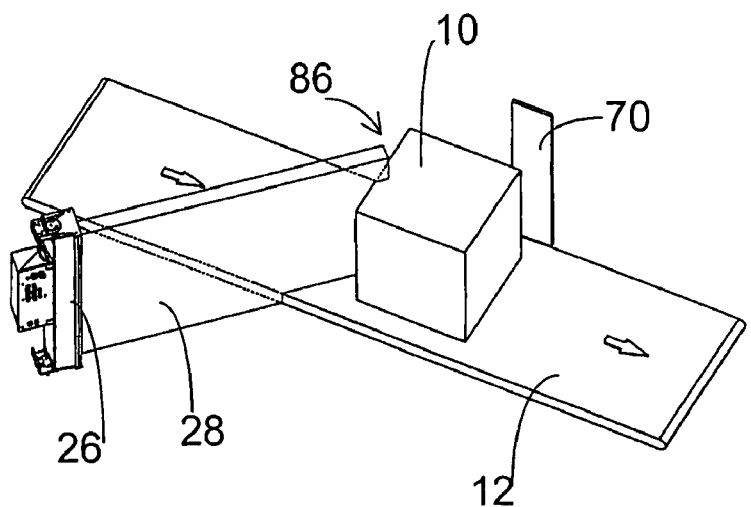
Figure 9C:
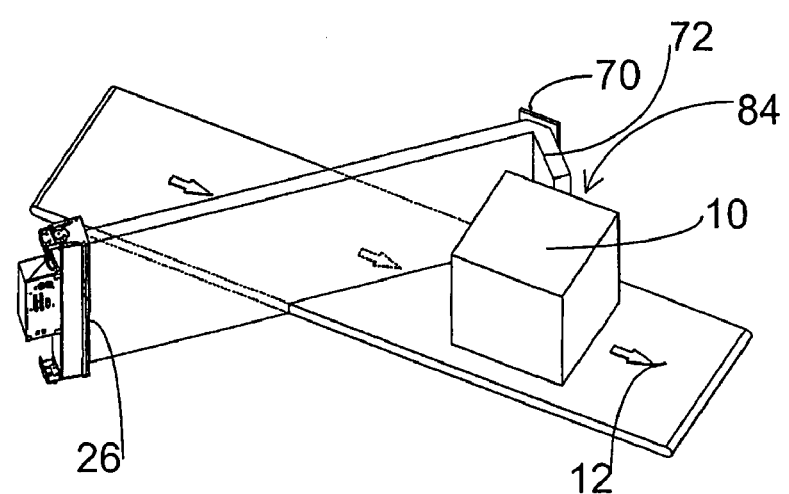

FIG. 9 shows an aspect using a mirror 70 to save a scanning unit.

The arrangement includes a scanning unit 26 with a scanning zone 28 such as is e.g. explained with respect to FIGS. 1 and 2. A body 10 having the side surfaces 80, 82, 84 and 86 is guided through the scanning zone 28 on a conveyor belt 12. In part FIG. 9a, the side surface 80 is just being scanned, whereas the surface 86 is being scanned in part FIG. 9b. After the body 10 has left the scanning zone 28, the light of the scanning unit 26 is incident onto the mirror 70 which it was previously unable to reach. The light is directed by the mirror 70 onto the surface 84 of the body 10. It is reflected there and transmitted by the mirror 70 back to the scanning unit 26 by whose light receiver unit it can be detected. The arrangement therefore makes possible the scanning of three side surfaces of the body 10 using only one scanning unit 26 by the skilful arrangement of the mirror 70.

With a corresponding arrangement of the redirector or if e.g. a plurality of redirectors are provided, even more sides of a body can be scanned using one scanning unit.

In addition, a determination device can be provided upstream of the scanning unit 26 which determines the position, the alignment and/or the geometry of the body 10 on the conveyor belt 12. If the scanning unit 26 and the mirror 70 are selected to be movable, e.g. in that the scanning units 26 is pivotable and the mirror 70 can be moved in a linear fashion accordingly along the conveyor belt 12, the optimum scanning direction of the scanning unit 26 can be determined in advance and the scanning unit 26 and the mirror 70 can be positioned accordingly with the aid of a control unit.

Figure 10A:
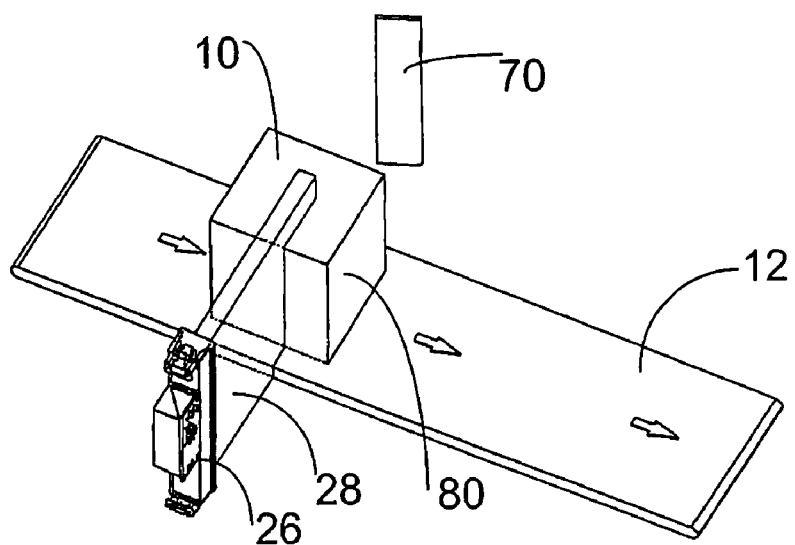
FIG. 10 illustrates a modified aspect of the fifth aspect of this method in accordance with the invention.
Figure 10B:
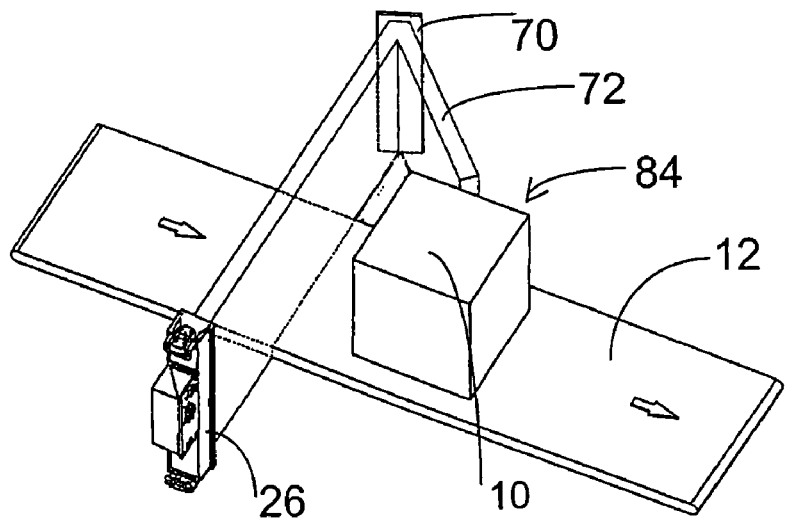
Figure 10C:
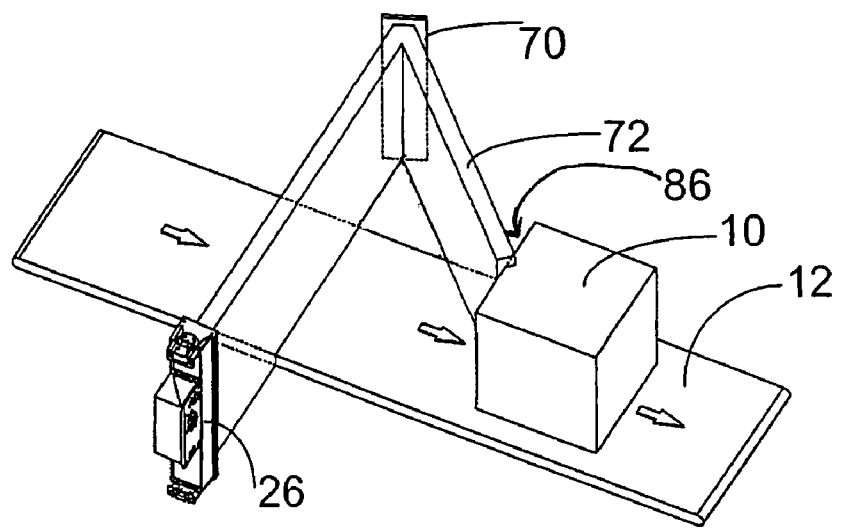

FIG. 10 shows another arrangement for the carrying out of a corresponding aspect of the method in which the scanning unit 26 is not aligned obliquely to the conveying direction of the conveyor belt 12, but transversely thereto. As long as the body 10 is directly in the scanning zone 28 of the scanning unit 26 (part FIG. 10a), the surface 80 is scanned. After the body 10 has left the scanning zone 28, the light reaches the mirror 70 and initially the surface 84 is scanned, with the reflected light being directed by the scanning zone 72 back to the mirror 70 and to the scanning unit 26 (part FIG. 10b). In the state of the part FIG. 10c, the surface 86 is scanned which is now located in the scanning zone 72.

In the same way as with FIG. 9, only a scanning unit 26 is necessary to scan three or more side surfaces. A determination device can also be provided upstream of the scanning unit in the embodiment of FIG. 10 in order to determine the position, alignment and/or geometry of the body on the conveyor belt 10 in advance and to be used for the optimum alignment of the scanning zone 28 and/or of the mirror 70.

An aspect, not shown, of a method in accordance with the invention is based on the fact that over-exposure is determined and the lighting unit and/or the receiver unit of a scanning unit is/are regulated correspondingly so that overexposure either does not take place (for example, as described when regulating down or switching off at least the affected parts of the lighting unit) or remains without influence on the quality of the image (for example, as described by lowering the sensitivity of at least the affected parts of the light receiver unit). The properties of the surfaces of the body, e.g. the remission, reflection or similar are thus inherently taken into account.

Such an aspect can particularly advantageously be combined with an aspect using scanning units with overlapping scanning zones which prevents a multiple exposure of the overlap zones of two scanning units or reduces their influence on the image quality by switching off or reducing the intensity of parts of a lighting unit, on the one hand, or by reducing the reception sensitivity of parts of a light receiver unit of a scanning unit, on the other hand.

The individually described aspects can be combined with one another such that the described advantages of the individual aspects can be realized in an accumulative fashion.

The invention makes possible a reduction in the construction structure e.g. by reducing the necessary reading field and/or reducing the number of the scanning units. In addition, the image quality can be improved by taking account of over-exposure in individual zones.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMBER LIST

| | |
|---|---|
| 10 | body |
| 12 | conveying device |
| 14 | scanning unit, pivotable |
| 16 | scanning zone |
| 18 | scanning unit, pivotable |
| 20 | scanning zone |
| 22, 24 | pivot axis |
| 26, 30 | scanning unit |
| 28, 32 | scanning zone |
| 34 | reading field |
| 36 | scanning unit |
| 38 | scanning zone |
| 40 | over-exposure zone |
| 42, 44 | deactivated zone |
| 46, 50 | scanning unit |
| 48, 52 | scanning zone |
| 60 | body |
| 70 | mirror |
| 72 | scanning zone |
| 80, 82, 84, 86 | side surfaces of the body |
| 88 | upper surface of the body |
| 104, 108, 112, 116, 120, 124 | scanning unit |
| 106, 110, 114, 118, 122, 126 | scanning zone |
| 130 | slot in the conveying device |
| 134 | reading field |
| A | critical over-exposure zone |

What is claimed is:

1. A scanning method for an optical scanning of at least a part surface of a body (10, 60), comprising:
    providing at least two scanning units (26, 30, 36, 46, 50), each including a lighting unit and a light receiver unit, each of the scanning units having one scanning zone (28, 32, 38, 48, 52) defined by the lighting unit and the light receiver unit, wherein the scanning zones of at least two scanning units overlap at least partly in an overlap zone (40);
    illuminating the body with the lighting units of at least two of the scanning units;
    receiving light transmitted from the lighting units onto the body and reflected by the body using light receiver units of the at least two scanning units; and
    reducing the scanning sensitivity of at least one of the scanning units 26, 30, 36, 46, 50) for the overlap zone (40), when the surface of the body (10) is in the overlap zone, in which the scanning zones of the at least two scanning units (26, 30, 36, 46, 50) overlap.

2. A scanning method in accordance with claim 1, wherein at least one of a position, an alignment and a geometry of the body (10), with respect to the at least one scanning unit, is determined and a determination is made from the at least one of the position, the alignment and the geometry when the surface of the body (10) is located in the overlap zone of the at least two scanning units (26, 30, 36, 46, 50).

3. A scanning method in accordance with claim 1, wherein the body (10) and the at least one scanning unit (26, 30, 36, 46, 50) are moved relative to one another.

4. A scanning method in accordance with claim 2, wherein the at least one of the position, the alignment and the geometry of the body is determined before the body (10 is located in the overlap zone of at least two scanning units (26, 30, 36, 46, 50).

5. A scanning method in accordance with claim 1, further comprising:
    checking whether a zone with over-exposure is present at a light receiver unit of a scanning unit (14,18, 26, 30, 36, 46, 50) while the body (10) is scanned; and
    if over-exposure is present, one of the intensity of at least one part of a lighting unit of at least one scanning unit (14,18,26,30,36,46,50), which illuminates the over-exposed zone, and the reception sensitivity of at least one part of a light receiver unit of at least one scanning unit which receives light from this zone is reduced.

6. A scanning method in accordance with claim 5, wherein, at least when over-exposure is found at a light receiver unit which receives light from the overlap zone, the scanning sensitivity of at least one of the scanning units is reduced at least for the overlap zone.

7. A scanning method in accordance with claim 1, wherein the scanning sensitivity of all scanning units with at least a partly overlapping scanning zone is reduced by an equal amount for a part of the overlap zone.

8. A scanning method in accordance with claim 1, wherein the reduction of the scanning sensitivity of at least one of the scanning units is achieved by reducing the intensity of at least that part of the lighting unit which illuminates the overlap zone.

9. A scanning method in accordance with claim 1,wherein the reduction of the scanning sensitivity of at least one of the scanning units is achieved by reduction of the reception sensitivity of at least that part of the light receiver unit onto which reflected light from the overlap zone is incident.

10. A scanning method in accordance with claim 1, wherein the reduction of the scanning sensitivity of at least one of the scanning units is achieved by deactivation of at least a part of the lighting unit which illuminates the overlap zone.

11. A scanning method in accordance with claim 1, wherein the body (10, 60) is moved relative to the at least one scanning zone.

12. A scanning method in accordance with claim 1, wherein at least one scanning unit is used which includes a redirector (70) which includes a mirror.

13. A scanning method in accordance with claim 12, wherein the at least one redirector is used to align the scanning zone of the at least one scanning unit such that it is passed through by a body to be scanned and led past.

14. A scanning method in accordance with claim 1, wherein a plurality of scanning units are used, of which at least two share a lighting unit whose light is spread over the scanning units by one or more beam splitters.

15. A scanning method in accordance with claim 1, wherein the light receiver unit and the lighting unit of a scanning unit (14,18,26,30, 36, 46, 50) are arranged adjacent to one another such that the light reflected by the body (10, 60) to the light receiver unit substantially takes the opposite path to light transmitted by the lighting unit through the scanning zone (16, 20, 28, 32, 38, 48, 52, 72) to the body (10, 60).

16. A scanning apparatus for the optical scanning of at least a part surface of a body (10, 60), comprising:
- at least two scanning units (26, 30, 36, 46, 50), each having at least one lighting unit for the illumination of at least a part of a reading field (34) and at least one light receiver unit for the reception of light possibly reflected from the reading field (34) and for the generation of a received signal, each of the scanning units having one scanning zone (28, 32, 38, 48, 52) defined by thel light path from the lighting unit to the light receiver unit, wherein the scanning zones of at least two scanning units overlap at least partly in an overlap zone (40);
- an evaluation unit for the evaluation of the received signal; and
- a control unit for the control of the scanning sensitivities such that at least when a surface of a body (10) is located in the overlap zone in which the scanning zones (28, 32, 38, 48, 52) of at least two scanning units (26, 30, 36, 46, 50) overlap, the scanning sensitivity of at least one of the scanning units (26, 30, 36, 46, 50) is reduced at least for the overlap zone (40).

17. A scanning apparatus in accordance with claim 16, further comprising a determination device for determining as least one of a position, an alignment and a geometry of a body (10) to be scanned with respect to the at least one lighting unit and the at least one light receiver unit.

18. A scanning apparatus in accordance with claim 16, further comprising a transport device (12) for the transport of the body (10, 60) through the reading field (34).

19. A scanning apparatus in accordance with claim 17, wherein the determination device is arranged upstream of the reading field (34).

20. A scanning apparatus in accordance with claim 16, further comprising a device for determining an intensity of illumination at at least one part of at least one light receiver unit and one control unit which is configured to carry out the scanning.

21. A scanning apparatus in accordance with claim 16, wherein at least one scanning unit includes at least one redirector (70) which includes a mirror.

22. A scanning apparatus in accordance with claim 16, further comprising at least one beam splitter for the splitting of the light of a lighting unit over a plurality of scanning units.

23. A scanning apparatus in accordance with claim 16, wherein the light receiver unit and the lighting unit of a scanning unit (14, 18, 26, 30, 36, 46, 50) are arranged adjacent to one another such that the light reflected by the body (10, 60) to the light receiver unit substantially takes the opposite path to light transmitted by the lighting unit through the scanning zone (16, 20, 28, 32, 38, 48, 52, 72) to the body (10, 60).

24. A scanning apparatus in accordance with claim 16, wherein the lighting unit of the at least one scanning unit (14, 1 8, 26, 30, 36, 46, 50) includes a plurality of light emitting diodes.

25. A scanning apparatus in accordance with claim 16, wherein the light receiver unit of the at least one scanning unit (14,18, 26, 30, 46, 50) includes a plurality of CMOS sensors or COD sensors.

* * * * *